(12) United States Patent
Nishinaka et al.

(10) Patent No.: US 8,968,930 B2
(45) Date of Patent: Mar. 3, 2015

(54) ELECTRODE FOR A NONAQUEOUS ELECTROLYTE SECONDARY BATTERY, NONAQUEOUS ELECTROLYTE SECONDARY BATTERY, AND METHOD OF MANUFACTURE OF ELECTRODE FOR A NONAQUEOUS ELECTROLYTE SECONDARY BATTERY

(75) Inventors: Shumpei Nishinaka, Osaka (JP); Takahiro Matsuyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 313 days.

(21) Appl. No.: 13/429,753

(22) Filed: Mar. 26, 2012

(65) Prior Publication Data

US 2012/0276447 A1    Nov. 1, 2012

(30) Foreign Application Priority Data

Mar. 31, 2011 (JP) ................. 2011-079358

(51) Int. Cl.

| | | |
|---|---|---|
| *H01M 4/13* | (2010.01) | |
| *H01M 4/1395* | (2010.01) | |
| *H01M 4/54* | (2006.01) | |
| *H01M 4/131* | (2010.01) | |
| *H01M 4/139* | (2010.01) | |
| *H01M 4/134* | (2010.01) | |
| *H01M 4/38* | (2006.01) | |
| *H01M 4/485* | (2010.01) | |
| *H01M 4/62* | (2006.01) | |
| *H01M 4/66* | (2006.01) | |
| *H01M 10/052* | (2010.01) | |

(52) U.S. Cl.
CPC .............. *H01M 4/131* (2013.01); *H01M 4/139* (2013.01); *H01M 4/134* (2013.01); *H01M 4/386* (2013.01); *H01M 4/485* (2013.01); *H01M 4/621* (2013.01); *H01M 4/624* (2013.01); *H01M 4/661* (2013.01); *H01M 10/052* (2013.01); *Y02E 60/122* (2013.01)
USPC .......... 429/219; 429/211; 429/218.1; 429/232

(58) Field of Classification Search
CPC ..... H01M 4/02; H01M 4/0404; H01M 4/131; H01M 4/134; H01M 4/139; H01M 10/052
USPC ............................... 429/211, 218.1, 232, 219
See application file for complete search history.

(56) References Cited

U.S. PATENT DOCUMENTS

2003/0068557 A1    4/2003    Kumashiro et al.
(Continued)

FOREIGN PATENT DOCUMENTS

| CN | 101421867 A | 4/2009 |
|---|---|---|
| JP | H11-40140 A | 2/1999 |

(Continued)

*Primary Examiner* — Jonathan Jelsma
(74) *Attorney, Agent, or Firm* — Nixon & Vanderhye P.C.

(57) ABSTRACT

An electrode for a nonaqueous electrolyte secondary battery includes a current collector and an electrode material disposed on the current collector. the electrode material has a thickness of 50 μm or larger. The electrode material contains at least active material particles, an electro-conductive material, and a crack preventive material. An average particle diameter of the crack preventive material is two times or larger than an average particle diameter of the active material particles.

5 Claims, 10 Drawing Sheets

(56) References Cited

U.S. PATENT DOCUMENTS

| | | |
|---|---|---|
| 2006/0127773 A1 | 6/2006 | Kawakami et al. |
| 2009/0104526 A1 | 4/2009 | Tanino et al. |
| 2010/0021817 A1 | 1/2010 | Kawakami et al. |
| 2010/0316907 A1* | 12/2010 | Yamamoto et al. ........... 429/188 |
| 2010/0323241 A1 | 12/2010 | Kawakami et al. |
| 2011/0159364 A1* | 6/2011 | Nishinaka et al. ............ 429/217 |
| 2012/0156560 A1 | 6/2012 | Hong et al. |

FOREIGN PATENT DOCUMENTS

| | | |
|---|---|---|
| JP | 2002-358966 A | 12/2002 |
| JP | 2007-165061 A | 6/2007 |
| JP | 2010-114042 A | 5/2010 |
| JP | 2011-44320 A | 3/2011 |
| JP | 2012-528451 A | 11/2012 |
| WO | 2010/137889 A2 | 2/2010 |

* cited by examiner

FIG. 2

| MATERIAL | ACTIVE MATERIAL IRON LITHIUM PHOSPHATE | ELECTRO-CONDUCTIVE MATERIAL ACETYLENE BLACK | BINDING AGENT STYRENE-BUTADIENE RUBBER | THICKENING AGENT CARBOXYMETHYLCELLULOSE | CRACK PREVENTIVE MATERIAL CARBON |
|---|---|---|---|---|---|
| PARTICLE DIAMETER (μm) | SEE FIG. 4 | 0.1 | – | – | SEE FIG. 4 |
| WEIGHT RATIO | 100 | 9 | 6.2 | 3.5 | 10 |

FIG. 4

| EXAMPLE/COMPARISON EXAMPLE | ACTIVE MATERIAL (IRON LITHIUM PHOSPHATE) PARTICLE DIAMETER (μm) | CRACK PREVENTIVE MATERIAL (CARBON) | | ELECTRODE MATERIAL THICKNESS μm | CRACK LEVEL | PARTICLE DIAMETER RATIO (CRACK PREVENTIVE MATERIAL/ACTIVE MATERIAL) | GOOD/POOR DETERMINATION |
| --- | --- | --- | --- | --- | --- | --- | --- |
| | | PARTICLE DIAMETER μm | SHAPE | | | | |
| COMPARISON EXAMPLE1 | 0.5 | 0.1 | CHAIN | 400 | 4 | 1/5 | NG |
| EXAMPLE1 | 0.5 | 4 | POTATO | 400 | 2 | 8 | OK |
| EXAMPLE2 | 0.5 | 10 | SPHERICAL SHAPE | 400 | 1 | 20 | OK |
| EXAMPLE3 | 0.5 | 20 | SPHERICAL SHAPE | 400 | 1 | 40 | OK |
| EXAMPLE4 | 0.5 | 50 | FLAT | 400 | 1 | 100 | OK |
| EXAMPLE5 | 0.5 | 60 | FLAT | 400 | 1 | 120 | OK |
| EXAMPLE6 | 0.5 | 150 | FLAT | 400 | 1 | 300 | OK |
| COMPARISON EXAMPLE2 | 5 | 0.1 | CHAIN | 400 | 4 | 1/50 | NG |
| COMPARISON EXAMPLE3 | 5 | 4 | POTATO | 400 | 3 | 4/5 | NG |
| EXAMPLE7 | 5 | 10 | SPHERICAL SHAPE | 400 | 2 | 2 | OK |
| EXAMPLE8 | 5 | 20 | SPHERICAL SHAPE | 400 | 2 | 4 | OK |
| EXAMPLE9 | 5 | 50 | FLAT | 400 | 2 | 10 | OK |
| EXAMPLE10 | 5 | 60 | FLAT | 400 | 1 | 12 | OK |
| EXAMPLE11 | 5 | 150 | FLAT | 400 | 1 | 30 | OK |
| COMPARISON EXAMPLE4 | 10 | 0.1 | CHAIN | 400 | 4 | 1/100 | NG |
| COMPARISON EXAMPLE5 | 10 | 4 | POTATO | 400 | 3 | 2/5 | NG |
| COMPARISON EXAMPLE6 | 10 | 10 | SPHERICAL SHAPE | 400 | 3 | 1 | NG |
| EXAMPLE12 | 10 | 20 | SPHERICAL SHAPE | 400 | 2 | 2 | OK |
| EXAMPLE13 | 10 | 50 | FLAT | 400 | 2 | 5 | OK |
| EXAMPLE14 | 10 | 60 | FLAT | 400 | 1 | 6 | OK |
| EXAMPLE15 | 10 | 150 | FLAT | 400 | 1 | 15 | OK |

FIG. 6

| | ACTIVE MATERIAL | | ELECTRODE THICKNESS μm | CRACK LEVEL | GOOD/POOR DETERMINATION |
|---|---|---|---|---|---|
| | MATERIAL | PARTICLE DIAMETER μm | | | |
| EXPERIMENTAL EXAMPLE1 | NATURAL GRAPHITE | 20 | 400 | 2 | OK |
| EXPERIMENTAL EXAMPLE2 | IRON LITHIUM PHOSPHATE | 10 | 400 | 4 | NG |
| EXPERIMENTAL EXAMPLE3 | IRON LITHIUM PHOSPHATE | 5 | 400 | 4 | NG |
| EXPERIMENTAL EXAMPLE4 | IRON LITHIUM PHOSPHATE | 0.5 | 400 | 4 | NG |

FIG. 7

| | ACTIVE MATERIAL | | CRACK PREVENTIVE MATERIAL | | | ELECTRODE THICKNESS μm | ELECTRODE DENSITY (g/cm3) | 0.1C DISCHARGE CAPACITY (mAh/g) |
|---|---|---|---|---|---|---|---|---|
| | MATERIAL | PARTICLE DIAMETER μm | MATERIAL | PARTICLE DIAMETER μm | SHAPE | | | |
| EXAMPLE1 | IRON LITHIUM PHOSPHATE | 0.5 | CARBON | 4 | POTATO | 400 | 1.5 | 144.9 |
| EXAMPLE6 | IRON LITHIUM PHOSPHATE | 0.5 | CARBON | 150 | FLAT | 400 | 1.5 | 146 |

ELECTRODE FOR A NONAQUEOUS ELECTROLYTE SECONDARY BATTERY, NONAQUEOUS ELECTROLYTE SECONDARY BATTERY, AND METHOD OF MANUFACTURE OF ELECTRODE FOR A NONAQUEOUS ELECTROLYTE SECONDARY BATTERY

This application is based on Japanese Patent Application No. 2011-079358 filed on Mar. 31, 2011, the contents of which are hereby incorporated by reference.

BACKGROUND OF THE INVENTION

1. Field of the Invention

The present invention relates to an electrode for a nonaqueous electrolyte secondary battery, a nonaqueous electrolyte secondary battery, and a method of manufacture of the electrode for the nonaqueous electrolyte secondary battery.

2. Description of Related Art

A nonaqueous electrolyte secondary battery (e.g., a lithium ion secondary battery), as well known, has a positive electrode and a negative electrode. These electrodes have a structure in which an electrode material is attached on a current collector. The electrode material contains at least active material particles and electro-conductive material particles.

The electro-conductive material particles are used to improve electrical conductivity of the active material particles. Especially, at the positive electrode, to improve the electrical conductivity, the particle diameter of the electro-conductive material particle is equal to or smaller than the particle diameter of the active material diameter. In other words, if the particle diameter of the electro-conductive material particle is large, the electrical conductivity is insufficiently improved, and, usually, particles having a particle diameter larger than the active material particle diameter of the positive electrode are not used as the electro-conductive material.

As a typical example, lithium cobalt oxide is used as the active material of the positive electrode. In this case, acetylene black is chiefly used as the electro-conductive material. The lithium cobalt oxide is about 20 μm in average particle diameter, and the acetylene black is about 0.1 μm in average particle diameter. Besides, recently, from the viewpoint of safety and cost, iron lithium phosphate having a small particle diameter of about 15 to 0.05 μm is often used; in this case as well, an electro-conductive material having a particle diameter smaller than this is used.

Besides, natural graphite is often used as the active material of the negative electrode, and graphite as the electro-conductive material is added to the natural graphite. Generally, the natural graphite has a typical particle diameter of 20 to 30 μm, and the graphite has a typical particle diameter of 4 to 20 μm.

In the meantime, a lithium ion secondary battery has a large energy density and an excellent cycle characteristic. Therefore, the lithium ion secondary battery is used for power supplies of various apparatuses, is finding wider applications and is also expected as a power supply for household power.

However, in current circumstance, it is hard to obtain a large output and a large capacity is strongly desired. For example, for a large capacity of a secondary battery, it is proposed to use a high-molecular radical material as the active material of the electrode (e.g., JP-A-2010-114042).

This conventional technology has the following problems. Specifically, it is necessary to use a specific material (high-molecular radical material). Further, during a production time of the electrode, to prevent occurrence of a crack or a warp, it is necessary to add a special carbon fiber (carbon fiber that has an average fiber diameter of 0.01 to 0.5 μm, a fiber length of 15 to 100 μm, and substantially no branch structure) into the electrode.

Accordingly, it is preferable to achieve a large capacity of a nonaqueous electrolyte secondary battery without using the above specific material or special carbon fiber.

Further, it is preferable to achieve the large capacity by means of a method that has not been tried positively so far. Specifically, it is preferable to achieve the large capacity by increasing a coating amount per unit area of the electrode, that is, enlarging a thickness of the electrode material.

In the conventional nonaqueous electrolyte secondary battery, the electrode material has a thickness under 50 μm. However, it is possible to enlarge the capacity per unit area of the electrode in proportion to the thickness of the electrode material. For example, if the electrode material (e.g., electrode material of the positive electrode) has a thickness of 100 μm or larger, the capacity per unit area of the electrode also is two times or larger than conventional. Therefore, it is preferable that the electrode material (e.g., electrode material of the positive electrode) has a thickness of 50 μm or larger that is larger than conventional.

However, it is found out that there are the following problems if the thickness of the electrode material becomes large. Specifically, if the thickness of the electrode material becomes large, in a coating process, a drying process or after the drying during a production time of the electrode, a crack, which does not occur in the conventional, occurs on a surface of the electrode material attached on the positive electrode current collector, so that the electrode does not sufficiently function. Especially, in a case where the active material has a small particle diameter (e.g., nanoparticle), this phenomenon appears remarkably. Therefore, it is hard to use thick film coating.

SUMMARY OF THE INVENTION

It is an object of the present invention to provide an electrode for a large-capacity nonaqueous electrolyte secondary battery in which a crack detrimental to an electrode material does not occur even if a thickness of the electrode material is 50 μm or larger, a nonaqueous electrolyte secondary battery that has the electrode, and a method of manufacturing the electrode for the nonaqueous electrolyte secondary battery.

To achieve the above object, the inventors put a research forward. As a result of this, the inventors found out that it was possible to solve the above problems by adding a crack preventive material, which has an average particle diameter two times or larger than an average particle diameter of active material particles, into an electro-conductive material.

Specifically, based on the above discovery, an electrode for a nonaqueous electrolyte secondary battery according to the present invention includes a current collector and an electrode material disposed on the current collector. The electrode material has a thickness of 50 μm or larger. The electrode material contains at least active material particles, an electro-conductive material, and a crack preventive material. An average particle diameter of the crack preventive material is two times or larger than an average particle diameter of the active material particles.

A ratio of the active material particles contained in the electrode material and the crack preventive material contained in the electrode material is 100 parts by weight:5-30 parts by weight.

The active material particles have an average particle diameter of 0.5 to 15 µm. The crack preventive material has an average particle diameter of 4 to 180 µm.

The active material particles are an oxide that contains lithium. Or, the active material particles are one of Si, Sn, and a metal oxide that contains Si and Sn.

A nonaqueous electrolyte secondary battery according to the present invention includes a positive electrode and a negative electrode. At least one of the positive electrode and the negative electrode is the above electrode.

In a method of manufacturing an electrode for a nonaqueous electrolyte secondary battery according to the present invention, an electrode material is changed into a slurry state by means of a solvent. The slurry-state electrode material is applied onto a current collector. The electrode material is dried. An electrode having a thickness of 50 µm or larger is produced. The electrode material contains at least active material particles, an electro-conductive material, and a crack preventive material. An average particle diameter of the crack preventive material is two times or larger than an average particle diameter of the active material particles.

According to the present invention, in the case where the electrode material has a thickness of 50 µm or larger, a crack detrimental to practical applications does not occur. Therefore, it is possible to obtain an electrode for a large-capacity nonaqueous electrolyte secondary battery.

It is possible to easily obtain a nonaqueous electrolyte secondary battery that has a capacity larger than conventional. Besides, it is possible to obtain a method of manufacturing an electrode for a secondary battery that has a good yield.

BRIEF DESCRIPTION OF THE DRAWINGS

FIG. 2 is a composition descriptive view showing a composition of an electrode material in an embodiment of the present invention.

FIG. 4 is a view showing an active material in examples 1-15 of the present invention, and an active material in comparison examples 1-6, an particle diameter of a crack preventive material, and a relationship between a particle diameter ratio and a crack.

FIG. 6 is a view showing a crack level in experimental examples 1-4 that use an electrode material which does not use a crack preventive material.

FIG. 7 is a view showing a discharge capacity in the examples 1-6.

DETAILED DESCRIPTION OF THE INVENTION

Figure 1:
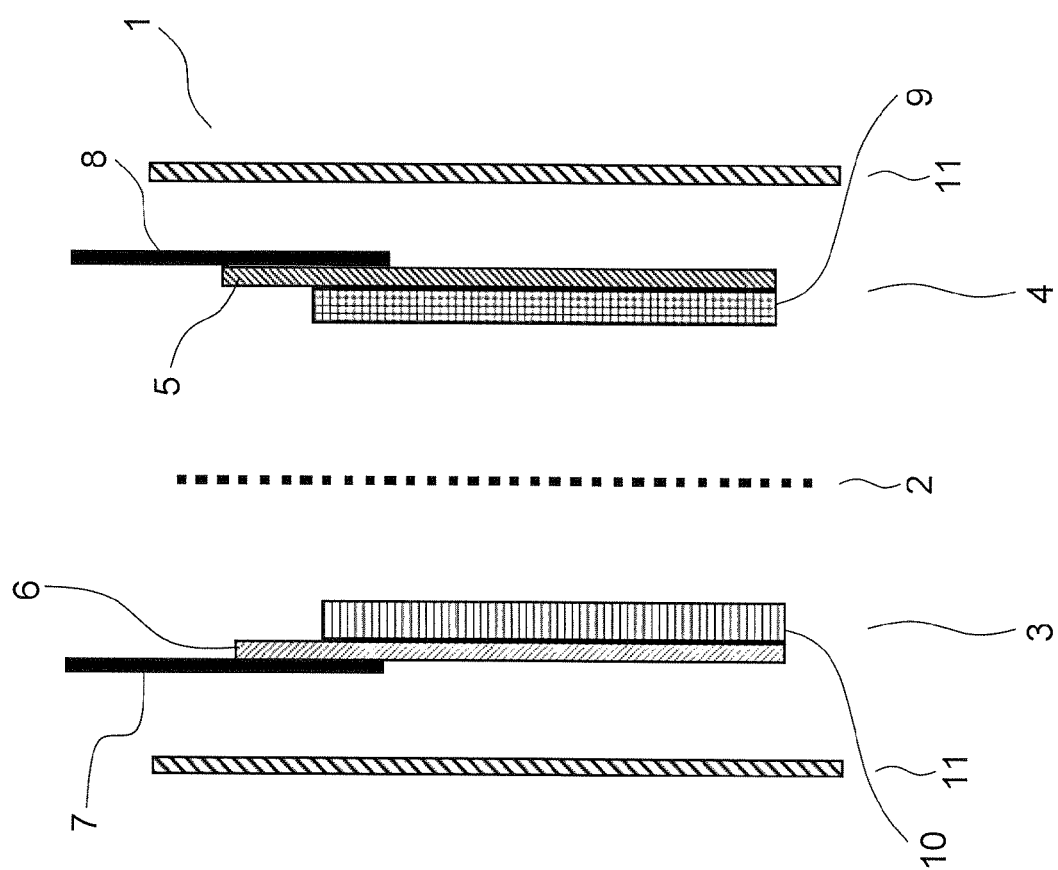
FIG. 1 is a descriptive view showing a structure of a nonaqueous electrolyte secondary battery according to the present invention.

Hereinafter, embodiments of the present invention are described with reference to the drawings. In FIG. 1, a lithium ion secondary battery 1 according to the present invention includes a positive electrode 4, a negative electrode 3 and a separator 2. The positive electrode 4 and the negative electrode 3 oppose each other via the separator 2.

The positive electrode 4 includes a positive electrode current collector 5 and a positive electrode material 9 (electrode material). The positive electrode current collector 5 includes a positive electrode lead 8 and is formed of an aluminum foil and the like. The positive electrode material 9 is attached on the positive electrode current collector 5. The positive electrode material 9 has a thickness of µm or larger.

The negative electrode 3 includes a negative electrode current collector 6 and a negative electrode material 10 (electrode material). The negative electrode current collector 6 includes a negative electrode lead 7 and is formed of a metal foil and the like. The negative electrode material 10 is formed on the negative electrode current collector 6. The negative electrode material 10 has a thickness of 20 µm or larger.

These are sealed by a facing film 11 (aluminum laminated facing body and the like). However, as a matter of fact, an electrolytic liquid is injected between the facing films 11, but the electrolytic liquid is not shown.

The positive electrode material 9, as shown in FIG. 2, contains: iron lithium phosphate as an active material; acetylene black as an electro-conductive material that has a particle diameter of 0.1 µm; styrene butadiene rubber as a binding agent; carboxymethylcellulose as a thickening agent; and carbon particles as a crack preventive material that has a predetermined particle diameter. A ratio of the iron lithium phosphate, the acetylene black, the styrene butadiene rubber, the carboxymethylcellulose, and the carbon particles is 100 parts by weight:9 parts by weight:6.2 parts by weight:3.5 parts by weight:10 parts by weight An average particle diameter of the crack preventive material is two times or larger than an average particle diameter of the active material particles. Because of this, as described later, a crack in the positive electrode material 9 is prevented.

As the crack preventive material, the carbon particles, which function as an electro-conductive material as well, are preferable. However, the crack preventive material may not positively function as an electro-conductive material. For example, polyethylene resin particles, aluminum metal powder, iron lithium phosphate and the like also are usable as the crack preventive material.

Here, as described above, the average particle diameter of the crack preventive material is two times or larger than the average particle diameter of the active material particles. Further, it is preferable that the average particle diameter of the crack preventive material is 4 to 180 µm.

It is preferable that a ratio of the active material and the crack preventive material is 100 parts by weight:5-30 parts by weight, and a ratio of 100 parts by weight:10-20 parts by weight is further preferable. A reason is that in a case where the crack preventive material is below 5 parts by weight, a sufficient crack preventive function is unobtainable; and in a case where the crack preventive material is over 30 parts by weight, a sufficient energy volume density is unobtainable.

Besides, as a shape of the crack preventive material, not only a spherical shape but also a flat-plate shape, a horseshoe shape and the like may be used. Here, a particle diameter of the iron lithium phosphate and a particle diameter of the carbon particle are described in detail later.

An effect of the crack preventive material occurs on the negative electrode material 10 in the same way as on the positive electrode material 9. However, usually, as the active material particles of the negative electrode material 3, carbon particles having a particle diameter of about 20 µm are chiefly used. In the negative electrode 3 under usual specifications, the particle diameter of the active material is large, so that a crack is unlikely to occur. In contrast to this, a preferable particle diameter of the active material of the positive electrode 4 is small (0.05 μm to 15 μm). In a case where the thickness of the positive electrode 4 is large, a crack occurs. Especially, the thickness of the positive electrode 4 is 100 to 2000 μm for a large capacity, so that a crack occurs easily.

However, in a case where at the negative electrode 3, another material (e.g., Si, Sn, or a metal oxide of these) is used as the active material and the particle diameter of the active material is small (e.g., 0.05 μm to 15 μm), if the thickness of the negative electrode material 10 becomes large as the thickness of the positive electrode 4 increases, a crack occurs. At this time, the crack preventive material shows the same effect as on the positive electrode 4.

A reason that the crack preventive material shows the crack preventive effect is described by means of FIG. 3A to FIG. 3D although it is a deduction. First, the positive electrode material 9 (electrode material) is applied onto a surface of the positive electrode current collector 5 under a state in which the positive material 9 is changed into a slurry state by means of a solvent (e.g., water), accordingly, it is deducible that a crack occurs thanks to drying. FIG. 3A to FIG. 3D show schematically a sectional appearance of the positive electrode material 9 (electrode material) before and after the drying.

Figure 3A:
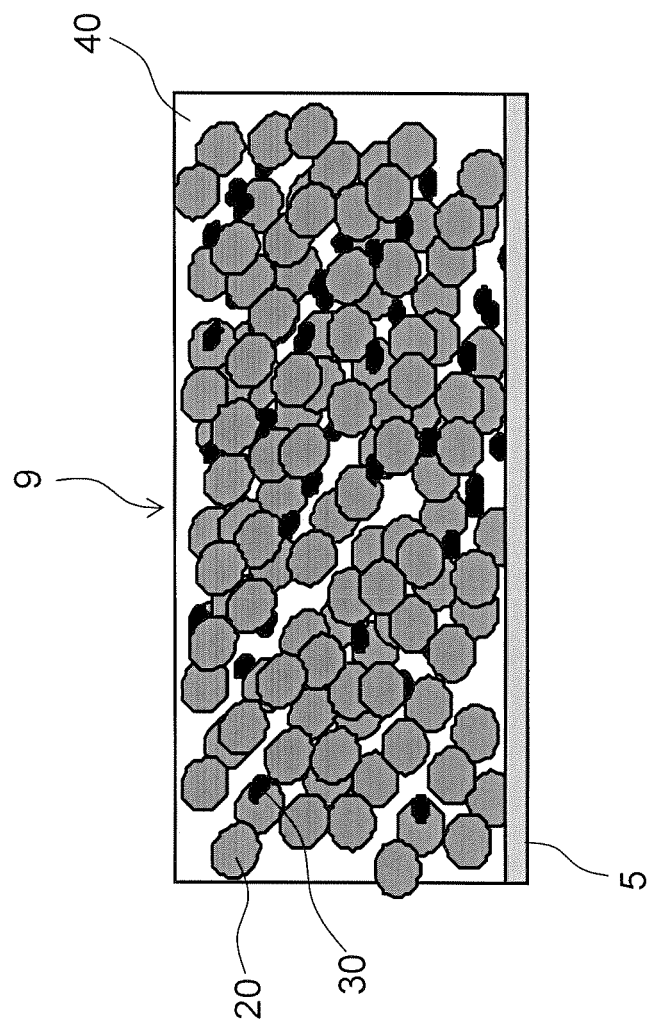
FIG. 3A is a descriptive view schematically showing a sectional state before drying of an electrode material that does not contain a crack preventive material.
Figure 3B:
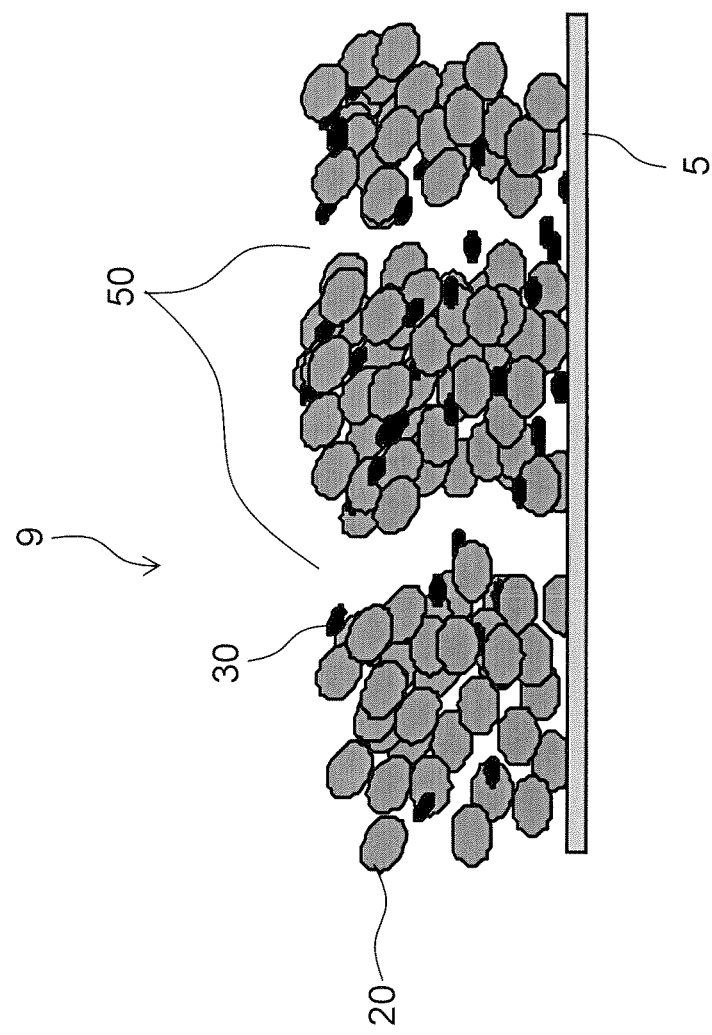
FIG. 3B is a descriptive view schematically showing a sectional state after drying of an electrode material that does not contain a crack preventive material.

FIG. 3A and FIG. 3B each show a case where the crack preventive material is not contained in the positive electrode material 9. FIG. 3A shows a state of the positive electrode material 9 before the drying, while FIG. 3B shows a state of the positive electrode material 9 after the drying. FIG. 3A, specifically, shows a state in which the slurry-state positive electrode material 9 is applied on the positive electrode current collector 5. The slurry-state positive electrode material 9 contains an active material 20, an electro-conductive material 30, and a liquid component 40 (water solution of a binding agent and a thickening agent).

At the positive electrode material 9, the liquid component 40 runs out during the drying time, whereby volume shrinkage occurs. Especially, in a case where the particle diameter of the active material 20 is small, the particles of the active material 20 become dense, accordingly, the volume shrinkage is large, and as shown in FIG. 3B, cracks 50 occur at a plurality of places.

Figure 3C:
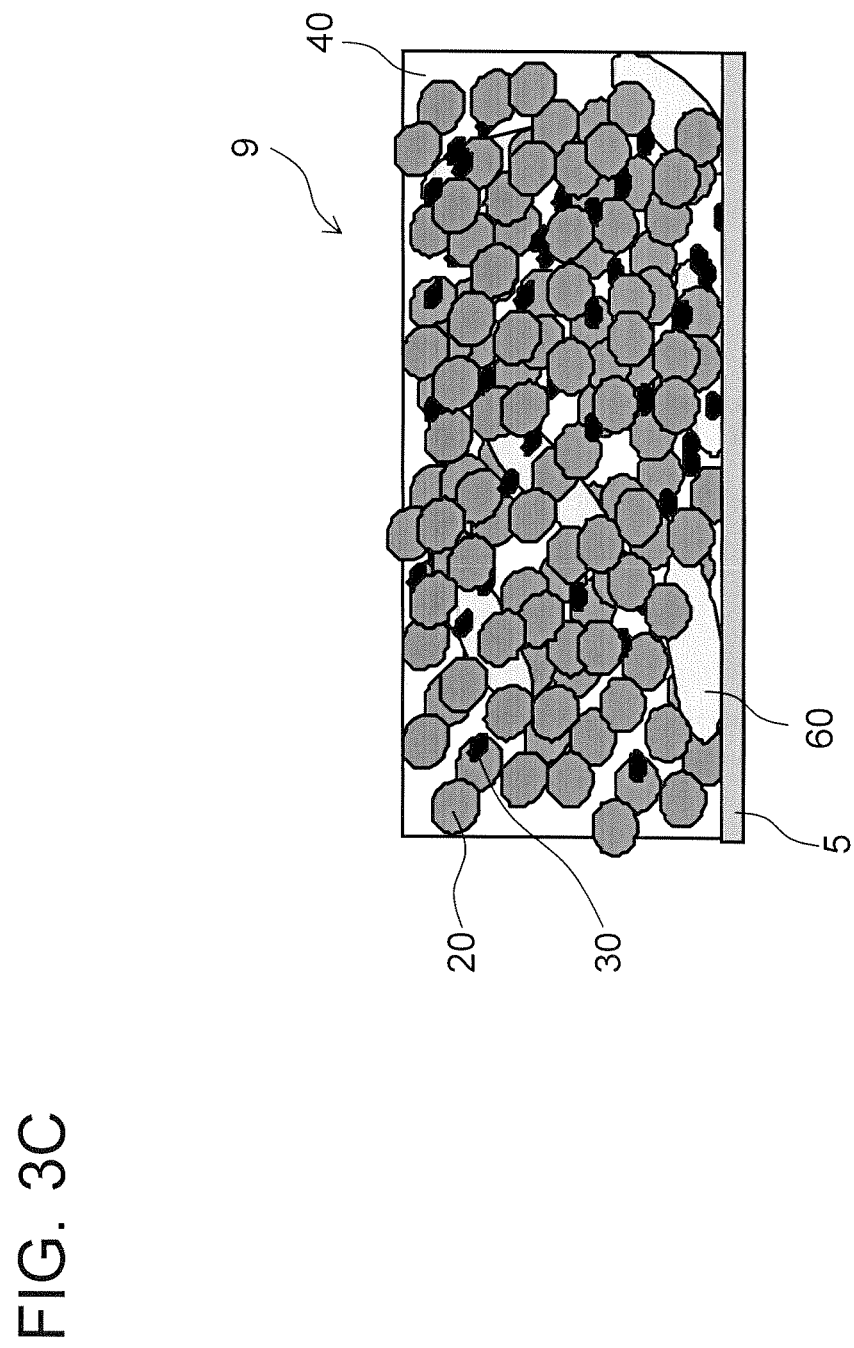
FIG. 3C is a descriptive view schematically showing a sectional state before drying of an electrode material that contains a crack preventive material.
Figure 3D:
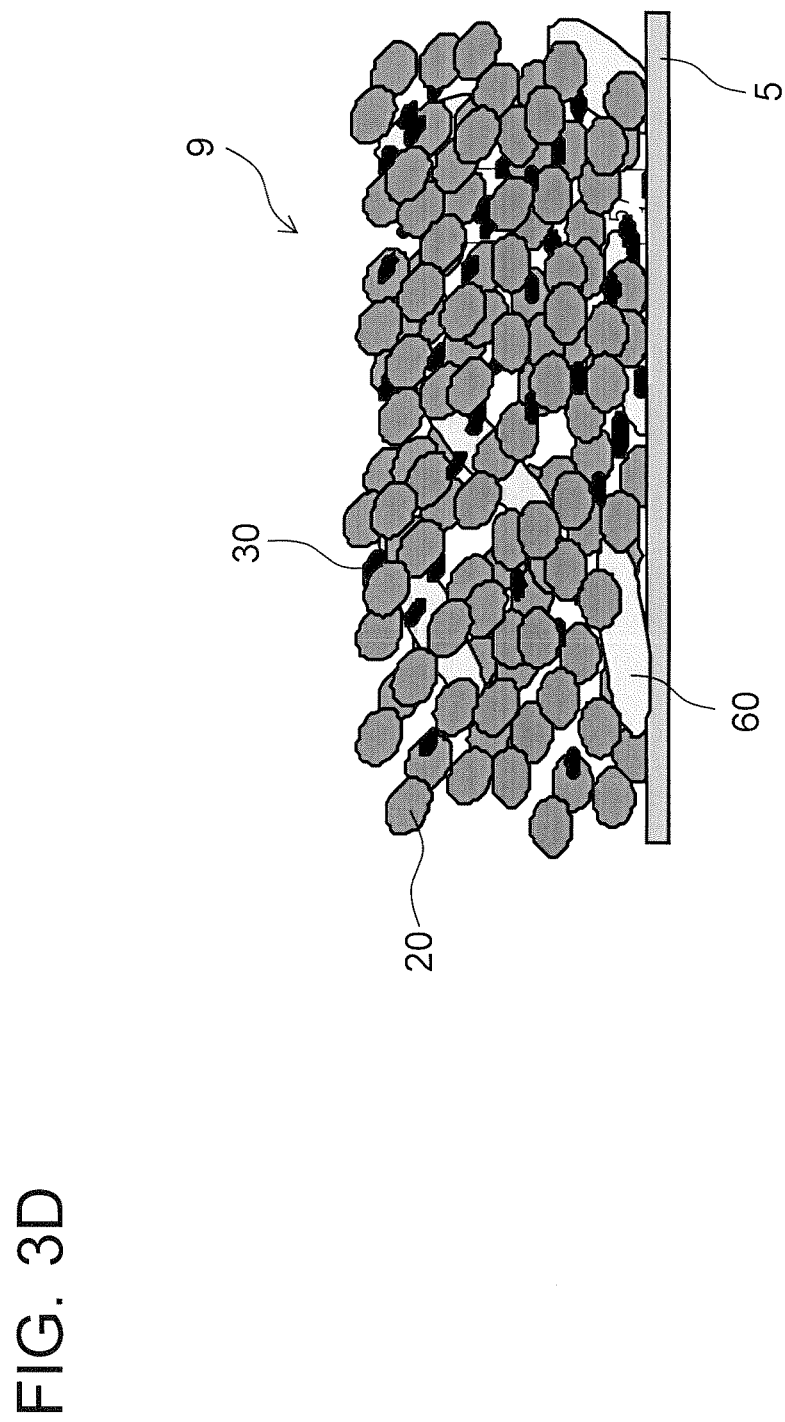
FIG. 3D is a descriptive view schematically showing a sectional state after drying of an electrode material that contains a crack preventive material.
Figure 5:
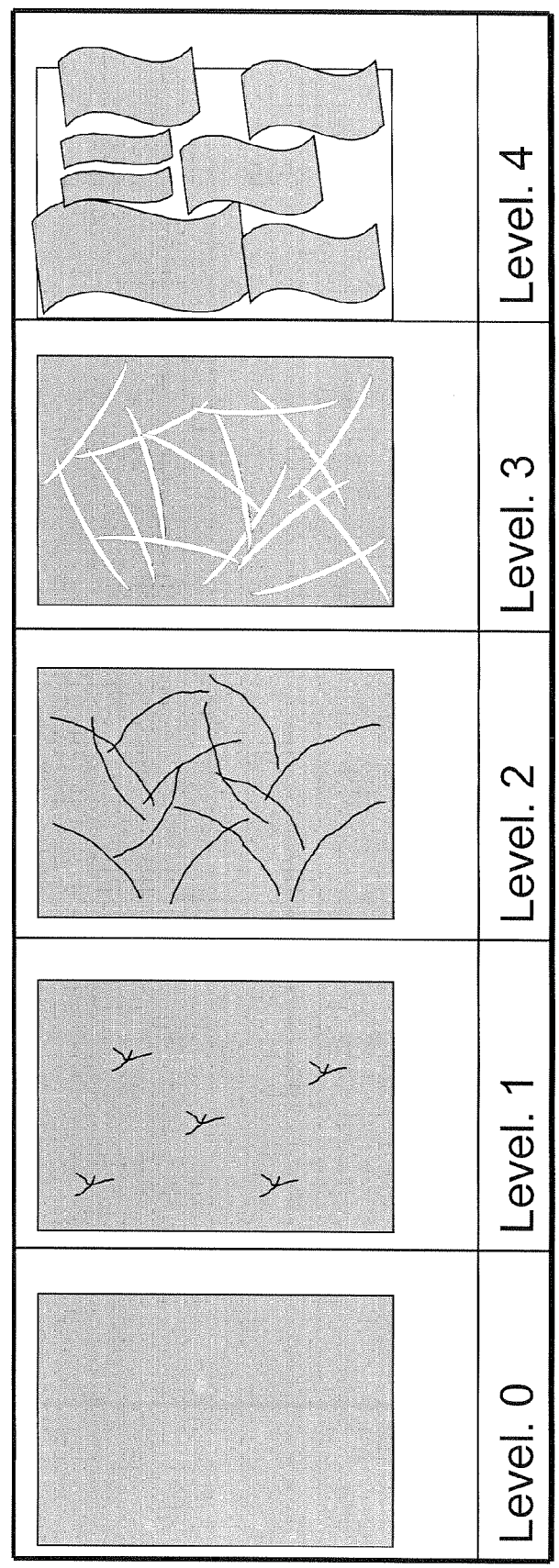
FIG. 5 is a view showing five-category crack levels on a surface of an electrode material after drying.

FIG. 3C and FIG. 3D each show a case where the positive electrode material 9 contains a crack preventive material 60. FIG. 3C shows a state of the positive electrode material 9 before the drying, while FIG. 3D shows a state of the positive electrode material 9 after the drying. FIG. 3C, specifically, shows a state in which the slurry-state positive electrode material 9 is applied on the positive electrode current collector 5. The slurry-state positive electrode material 9 contains the active material 20, the electro-conductive material 30, the liquid component 40 (water solution of the binding agent and the thickening agent), and the crack preventive material 60.

A reason that the crack is prevented is deduced as follows. Specifically, the crack preventive material 60 is overwhelmingly large in volume compared with the particles of the active material 20. Even if the liquid component 40 runs out thanks to the drying, a large gap is kept between the active material 20 and the crack preventive material 60 and shrinkage, which allows a crack to occur, does not appear, as a result of which, as shown in FIG. 3D, a crack does not occur.

In the meantime, here, the definition of the particle diameter in the present embodiment indicates a particle diameter that is measured by means of the Nano Particle Size Analyzer SALD-100 (Shimadzu Corporation). The particle diameter obtained from the measurement is a spherical diameter and is generally equal to the longest diameter of the particle.

Hereinafter, each constituent element of the above lithium ion secondary battery is described in further detail.

(Current Collector)

A publicly known material of the lithium ion secondary battery is used for the positive electrode current collector 5 and the negative electrode current collector 6 shown in FIG. 1. As the positive electrode current collector 5, for example, a foil or a thin plate of an electro-conductive metal formed of SUS, aluminum or the like is used. As the negative electrode current collector 6, for example, a metal foil formed of copper or the like is used.

The positive electrode 4 is obtained by applying the positive electrode material 9 onto the positive electrode current collector 5, while the negative electrode 3 is obtained by applying the negative electrode material 10 onto the negative electrode current collector 6. Surfaces of the positive electrode current collector 5 and the negative electrode current collector 6 are not always a flat surface, and may be a surface on which concave and convex portions are formed.

(Electrode Material)

A publicly known material of the lithium ion secondary battery is used for the electrode material (the positive electrode material 9 and the negative electrode material 10). In the case of the lithium ion secondary battery, as the active material of the positive electrode 4, an oxide containing lithium is usable. For example, it is preferable to use a composite oxide, a sulfide or a selenide that are formed of lithium and at least one of titanium, molybdenum, copper, niobium, vanadium, manganese, chromium, nickel, iron, cobalt, phosphorus and the like; specifically, it is possible to use only one of or any combination of $LiMnO_2$, $LiMn_2O_4$, $LiNiO_2$, $LiCoO_2$, $LiCrO_2$, $LiFeO_2$, $LiVO_2$ and $LiMPO_4$ (M is at least one element selected from Co, Ni, Mn, and Fe).

Besides, as the active material of the negative electrode 3, it is possible to use only one of or any combination of graphite-relative substances such as natural graphite, synthetic graphite, highly crystalline graphite and the like, an amorphous carbon-relative substance, Si, Sn, and metal oxides of $Nb_2O_5$, $LiTiO_4$ and the like.

Further, for the positive electrode material 9 and the negative electrode material 10, it is possible to use an electro-conductive material, a binding agent, a thickening agent, a filler, a dispersing agent, an ion electro-conductive material, a pressure boosting agent that are described later and other various additives. In FIG. 1, between the facing films 11, the positive electrode 4, the negative electrode 3, and the separator 2 are each used by one. However, the positive electrode, the negative electrode and the separator may be laminated between the facing films in a predetermined order. For example, the positive electrode, the negative electrode and the separator may be laminated in an order of the negative electrode/the separator/the positive electrode/the separator/ . . . /the positive electrode/the separator/the negative electrode. In this case, the electrode material is formed on both surfaces of the current collector. However, at the electrodes situated at both ends, the electrode material is formed on an inside surface only of the current collector and may not be formed on an outside surface of the current collector.

The electrode materials (the positive electrode material 9 and the negative electrode material 10) formed on the respective current collectors 5, 6 of the positive electrode 4 and the negative electrode 3 suitably have a thickness of about 20 to 500 μm, and preferably have a thickness of about 100 to 400 μm.

As the electro-conductive material, an electronic conductive material, which is generally used as a battery material and does not cause a chemical reaction in a battery, is used. For example, it is possible to use only one of or a combination of: graphite relatives such as natural graphite (scale-like graphite, scale piece-like graphite, soil-like graphite and the like), synthetic graphite and the like; carbon black relatives such as acetylene black, ketjen black, channel black, furnace black, lamp black, thermal black and the like; electro-conductive fiber relatives such as a vapor grown carbon fiber (VGCF), a carbon fiber, a metal fiber and the like; metal powder relatives such as copper, nickel, aluminum, silver and the like; electro-conductive whisker relatives such as a zinc oxide, potassium titanate and the like; electro-conductive metal oxides such as a titanium oxide and the like; and organic electro-conductive materials such as a polyphenylene derivative and the like. Of these electro-conductive materials, it is especially preferable to use acetylene black, VGCF, and a combination of graphite and acetylene black.

As the binding agent, one of or a combination of a polysaccharide, a thermoplastic resin and a polymer having rubber elasticity, which are used generally as an battery material, is used. For example, used is one of or a combination of: starch; polyvinyl alcohol; carboxymethylcellulose; hydroxy propyl cellulose; regenerated cellulose; diacetyl cellulose; polyvinyl chloride; polyvinylpyrrolidone; polytetrafluoroethylene; polyvinylidene fluoride; polyethylene; polypropylene; ethylene-propylene-dieneterpolymer (EPDM); sulfonated EPDM; styrene-butadiene rubber; polybutadiene; fluororubber; and polyethylene oxide.

As the thickening agent, for example, used are: starch; polyvinyl alcohol; carboxymethylcellulose; hydroxy propyl cellulose; regenerated cellulose; diacetyl cellulose; polyninyl chloride and the like.

As the filler, a fiber material, which is generally used as a battery material and does not cause a chemical reaction in the lithium ion secondary battery, is used. For example, usable are: olefin-relative polymers such as polypropylene, polyethylene and the like; and fibers such as glass, carbon and the like.

As the ion electro-conductive material, for example, used are: a polyethylene oxide derivative or a polymer that contains the derivative; a polypropylene oxide derivative; a polymer that contains the derivative; a phosphate ester polymer and the like. These are generally known as an inorganic solid electrolyte or an organic solid electrolyte.

The pressure boosting agent is a compound that boosts an internal pressure of a battery. A typical example is carbonate.

(Separator)

As the separator 2 shown in FIG. 1, an insulating thin film, which has a large ion permeability and a predetermined mechanical strength, is used. As a material that constitutes the separator, a material, which is not damaged by a nonaqueous electrolyte, may be used. For example, usable are: polyolefin-relative resins such as polyethylene, polypropylene, poly-4-methylpentene-1 and the like; polyester-relative resins such as polyethylene terephthalate, polybutylene terephthalate, polyethylene naphthalate, polytrimethylene terephthalate and the like; polyamide-relative resins such as 6 nylon, 66 nylon, fully aromatic polyamide and the like; a fluorine-relative resin; a polyimide-relative resin; a cellulose-relative resin; an aramid-relative resin; a glass fiber and the like. Two or more of these materials may be mixed. The form of the separator is a nonwoven fabric; a woven fabric; a micro-porous film and the like.

Especially, from the viewpoint of quality stability and the like, as the separator, preferable is: a nonwoven fabric or a micro-porous film formed of polyethylene, polypropylene, polyester or the like. In a case where the secondary battery extraordinarily generates heat, the separator is melted by the heat, and a function (shut down) to disconnect the positive electrode and the negative electrode from each other is added to the secondary battery.

Polyimide-, polyamide-, and aramid-relative resins have an excellent shape stability. In other words, these resins have an advantageous point that the shape is stable even if the temperature rises.

(Nonaqueous Electrolyte)

The nonaqueous electrolyte is, for example, a solution in which salt electrolyte is dissolved in an organic solvent.

In the case of the lithium ion secondary battery, the salt electrolyte is lithium salt that contains lithium as a cationic component. The lithium salt is lithium salt that contains as an anion component, for example, lithium tetrafluoroborate, lithium hexafluorophosphate, lithium perchlorate, or organic acid (fluorine substituted organic sulfonic acid or the like).

As the organic solvent, any material which dissolves the salt electrolyte is usable. For example, used are: cyclic carbonate relatives such as ethylene carbonate, propylene carbonate, butylene carbonate and the like; cyclic ester relatives such as γ-butyrolactone and the like; ether relatives such as tetrahydrofuran, dimethoxyethane and the like; and chain carbonate relatives such as dimethyl carbonate, diethyl carbonate, ethyl methyl carbonate and the like. These organic solvents are used alone, or a mixture of two or more of them is used.

(Electrode Manufacturing Method)

A manufacturing method of the electrode is not especially limited, and a method suitably selected in accordance with the material is usable. In a general manufacturing method of the electrode, first, a solvent such as water, NMP or the like is mixed with each material and stirred to produce a slurry-state even fluid dispersion. The fluid dispersion is applied onto the current collector. By heating or at a normal temperature, the solvent volatilizes.

Hereinafter, details of the electrode material used for the present invention, especially, a relationship among the particle diameter of the active material, the particle diameter of the crack preventive material, the film thickness, and crack degrees is described in more detail by means of examples.

EXAMPLES

The positive electrode material used in examples, as shown in an electrode composition table of FIG. 2, contains: iron lithium phosphate as the active material; acetylene black as the electro-conductive material that has a particle diameter of 0.1 μm; styrene butadiene rubber as the binding agent; carboxymethylcellulose as the thickening agent; and carbon particles having a weight ratio of 10 as the crack preventive material that has a predetermined particle diameter. A ratio of the iron lithium phosphate, the acetylene black, the styrene butadiene rubber, the carboxymethylcellulose, and the carbon particles is 100 parts by weight:9 parts by weight:6.2 parts by weight:3.5 parts by weight:10 parts by weight, These are used to produce an aqueous positive electrode slurry. The positive electrode slurry is applied onto the aluminum foil that is the positive electrode current collector 5; dried by means of a hot wind to be attached onto the positive electrode current collector 5.

Here, the particle diameter of the iron lithium phosphate, the particle diameter of the carbon particles that is the crack preventive material, and a particle diameter ratio are described in each example.

FIG. 4 is a table for easy understanding of specific examples 1 to 15 of the crack preventive material. In the example 1 to the example 15, combinations of the particle diameter of the active material (iron lithium phosphate) and the particle diameter of the crack preventive material (carbon) are different from one another. In the examples, the weight composition ratio of the positive electrode material 9 and the film thickness of the positive electrode material 9 are the same as one another; the weight composition ratio of the positive electrode material 9 is as shown in FIG. 2, and the film thickness of the positive electrode material 9 is 400 μm.

In the example 1 to the example 6, the particle diameter of the active material (iron lithium phosphate) is 0.5 μm, and the particle diameter of the crack preventive material (carbon) is larger than this, that is, 4, 10, 20, 50, 60, and 150 μm. Here, the shape of the carbon particles is not uniform.

In a comparison example 1, the particle diameter (0.1 μm) of the carbon is smaller than the particle diameter (0.5 μm) of the active material. In this point, the example 1 to the example 6 are different from the comparison example 1.

In a comparison example 2, a comparison example 3, and the example 7 to the example 11, the particle diameter of the active material (iron lithium phosphate) is 5 μm. In the comparison example 2 and the comparison example 3, the particle diameter of the carbon is smaller than the particle diameter (5 μm) of the active material. On the other hand, in the example 7 to the example 11, the particle diameter of the carbon is larger than the particle diameter (5 μm) of the active material.

In a comparison example 4 to a comparison example 6 and the example 12 to the example 15, the particle diameter of the active material (iron lithium phosphate) is 10 μm. In the comparison example 4 to the comparison example 6, the particle diameter of the carbon is smaller than the particle diameter of the active material. On the other hand, in the example 12 to the example 15, the particle diameter of the carbon is larger than the particle diameter of the active material.

In all of the examples and the comparison examples, the thickness of the electrode material is 400 μm in common. Besides, the particle diameter ratio is a ratio obtained by dividing the particle diameter of the crack preventive material by the particle diameter of the active material, and is 8, for example, in the case of the example 1, which is a value of 4÷0.5.

The crack degree of the electrode material in the present examples is defined by classifying a surface state into five-category visual levels of a level 0 to a level 4.

The level 0 indicates a state in which no crack is confirmable on the entire surface.

The level 1 indicates a state in which cracks occur thanks to local strain due to air voids, condensates and the like.

The level 2 indicates a state in which cracks occur on the entire surface thanks to a volume change during the drying time. However, in the level 2, no peeling is found.

The level 3 indicates a state in which cracks occur on the entire surface thanks to the volume change during the drying time and the cracks are so large that the bottom metal is confirmable. However, in the level 3, no peeling is found.

The level 4 indicates a state in which peeling occurs and the electrode falls off thanks to slight shaking.

In any one of the level 0, the level 1, and the level 2 of the cracks, the electrode is usable. No peeling is found and recovery of the electrode is possible by crushing the cracks during a pressure process after the coating and drying, accordingly, the electrode sufficiently functions.

In the level 3 or in the level 4 of the cracks, many cracks occur and the electrode is unusable.

Before evaluating the results in FIG. 4, experiments were performed to see what kinds of cracks occur in a case where the crack preventive material is not used, that is, a case where the film thickness is large in the conventional technology.

Experimental Examples

In an experimental example 1 to an experimental example 4, as shown in FIG. 6, as the active material, natural graphite having a particle diameter of 20 μm is used and iron lithium phosphates having particle diameters of 10 μm, 5 μm, and 0.5 μm are used, and the thickness of the positive electrode material 9 is 400 μm.

As the "crack level" in FIG. 6 indicates, in the case where the natural graphite having the particle diameter of 20 μm is used as the active material, a serious crack does not occur. On the other hand, in the cases where the iron lithium phosphates having the particle diameter of 10 μm or smaller are used, the crack level is the level 4 and the electrode does not sufficiently function. As described above, in the case where the crack preventive material is not used; the film thickness is large; and the particle diameter of the active material is small, cracks occur.

According to the results shown in FIG. 4, in the comparison example 1 to the comparison example 6, the cracks detrimental to practical applications occur, while in the example 1 to the example 15, the cracks detrimental to practical applications do not occur.

The comparison example 1 to the comparison example 6 are different from the example 1 to the example 15 in particle diameter ratio. Specifically, in the comparison example 1 to the comparison example 6, the particle diameter ratio is 1 or smaller, while in the example 1 to the example 15, the particle diameter ratio is 2 or larger. In the case where the crack preventive material is used and the particle diameter ratio is 2 or larger, the cracks are effectively prevented.

There is actually no case where the particle diameter is larger than the film thickness, accordingly, an upper limit of the particle diameter ratio of the crack preventive material is equal to the film thickness.

FIG. 7 shows electrode densities and discharge capacities in the examples 1 and 6. According to FIG. 7, even if the particle diameter of the crack preventive material changes dramatically, the discharge capacity is about identical to a discharge capacity that is deducible from the capability of the conventional active material. It is understood that the addition of the crack preventive material has a small influence on the electrode characteristic.

What is claimed is:

1. An electrode for a nonaqueous electrolyte secondary battery, comprising:
   a current collector;
   an electrode material disposed on the current collector; wherein
   the electrode material has a thickness of 50 μm or larger;
   the electrode material contains at least active material particles, an electro-conductive material, and a crack preventive material;
   an average particle diameter of the crack preventive material is two times or larger than an average particle diameter of the active material particles;
   the crack preventive material has an average particle diameter larger than 10 μm and smaller than 180 μm;
   the active material particles have an average particle diameter of 0.5 to 15 μm; and wherein
   a ratio of the active material particles contained in the electrode material and the crack preventive material contained in the electrode material is 100 parts by weight:5-30 parts by weight.

2. The electrode according to claim 1, wherein the active material particles are an oxide that contains lithium.

3. A nonaqueous electrolyte secondary battery, comprising:
a positive electrode and a negative electrode; wherein at least one of the positive electrode and the negative electrode is the electrode according to claim 1.

4. A nonaqueous electrolyte secondary battery, comprising:
a positive electrode and a negative electrode, the negative electrode including:
a current collector; and
an electrode material disposed on the current collector; wherein
the electrode material has a thickness of 50 μm or larger;
the electrode material contains at least active material particles, an electro-conductive material, and a crack preventive material;
an average particle diameter of the crack preventive material is two times or larger than an average particle diameter of the active material particles;
the crack preventive material has an average particle diameter larger than 10 μm and smaller than 180 μm;
the active material particles have an average particle diameter of 0.5 to 15 μm; wherein
a ratio of the active material particles contained in the electrode material and the crack preventive material contained in the electrode material is 100 parts by weight:5-30 parts by weight; and
the active material particles are one of Si, Sn, and a metal oxide that contains Si and Sn.

5. A method of manufacturing an electrode for a nonaqueous electrolyte secondary battery, comprising the steps for:
changing an electrode material into a slurry state by means of a solvent;
applying the slurry-state electrode material onto a current collector;
drying the electrode material to produce an electrode in which the electrode material has a thickness of 50 μm or larger; wherein
the electrode material contains at least active material particles, an electro-conductive material, and a crack preventive material;
an average particle diameter of the crack preventive material is two times or larger than an average particle diameter of the active material particles;
the crack preventive material has an average particle diameter larger than 10 μm and smaller than 180 μm;
the active material particles have an average particle diameter of 0.5 to 15 μm; and wherein
a ratio of the active material particles contained in the electrode material and the crack preventive material contained in the electrode material is 100 parts by weight:5-30 parts by weight.

* * * * *